United States Patent
Lavey

[11] Patent Number: 5,919,238
[45] Date of Patent: Jul. 6, 1999

[54] METHOD FOR ALIGNING A VEHICLE SUSPENSION

[75] Inventor: Daniel William Lavey, Farmington Hills, Mich.

[73] Assignee: Ford Global Technologies, Inc., Dearborn, Mich.

[21] Appl. No.: 09/034,486

[22] Filed: Mar. 4, 1998

[51] Int. Cl.$^6$ .................................................. G01B 7/00
[52] U.S. Cl. ............................... 701/29; 701/33; 701/36; 701/37; 701/41; 33/203; 33/203.15
[58] Field of Search ................... 701/29, 33, 36, 701/7, 41; 33/203, 203.15

[56] References Cited

U.S. PATENT DOCUMENTS

| | | | |
|---|---|---|---|
| 4,138,825 | 2/1979 | Pelta | 33/228 |
| 4,500,201 | 2/1985 | Lill | 356/152 |
| 4,574,490 | 3/1986 | Curchod | 33/203.18 |
| 5,014,227 | 5/1991 | Kling et al. | 364/559 |
| 5,105,546 | 4/1992 | Weise et al. | 33/203.12 |
| 5,165,177 | 11/1992 | Kercheck | 33/203.18 |
| 5,291,660 | 3/1994 | Koerner | 33/203.12 |
| 5,329,452 | 7/1994 | Kercheck et al. | 701/36 |
| 5,442,549 | 8/1995 | Larson | 701/35 |
| 5,528,496 | 6/1996 | Brauer et al. | 701/32 |

FOREIGN PATENT DOCUMENTS

| | | |
|---|---|---|
| 34 46 301 | 6/1986 | Germany . |
| 95/08021 | 3/1995 | WIPO . |
| 96/2552 | 8/1996 | WIPO . |

*Primary Examiner*—William A. Cuchlinski, Jr.
*Assistant Examiner*—Yonel Beaulieu
*Attorney, Agent, or Firm*—Gregory P. Brown

[57] ABSTRACT

A method for aligning a suspension of vehicle permits rapid alignment of the suspension. The method eliminates the need to adjust camber by incorporating into a caster adjustment a factor that accounts for minor deviations in the camber angles. Additionally, rather than adjusting the caster of a right and left road wheel, the caster of only one of the road wheels needs to be adjusted. Specifically, the method further compensates the caster angle adjustment to account for pull or drift that might be induced by a differential camber angle.

16 Claims, 2 Drawing Sheets

METHOD FOR ALIGNING A VEHICLE SUSPENSION

BACKGROUND OF THE INVENTION

1. Field of the Invention

The present invention relates generally to a method for aligning a vehicle suspension. More particularly, the present invention relates to a method for compensating caster alignment settings to compensate for variations in camber angles.

2. Disclosure Information

When a motor vehicle is manufactured, one of the final steps in the assembly process includes the alignment of the road wheels of the vehicle. The proper alignment of the road wheels is necessary to ensure proper driving characteristics as well as optimal tire wear. One such driving characteristic is drift or pull, which refers to tendency of a vehicle to deviate from a straight line. A vehicle described as having poor drift or pull characteristics means that the vehicle is likely to deviate from the intended straight course of travel. This may be influenced by such external factors as cross winds or crowned roads, in addition to many other factors.

The adjustable alignment parameters usually associated with the steerable wheels of the vehicle, usually found at the front of the vehicle, include camber, caster and toe angles. A camber angle refers to an angle formed between an axis coincident with a wheel centerline and a vertical axis passing through a center of the road wheel, when viewed from the front. The camber angle is positive when the wheel center line at the top of the road wheel is outboard of the vertical axis. A caster angle refers to an angle formed between an axis passing through upper and lower ball joints (defining the steering axis) and the vertical axis passing through the center of the road wheel, when viewed from the side. The caster angle is positive when the axis passing through the ball joints is rearward of the vertical axis. A toe angle refers to an angle between the axis coincident with the wheel centerline and a longitudinal axis passing through the center of the road wheel, when viewed from above. The toe angle is referred to as toe-in when the wheel center line at the front of the road wheel is inboard of the longitudinal axis, and toe-out when it is outboard of the longitudinal axis.

Conventionally, an operator adjusts the camber, caster and toe angles so that they fall within a predetermined range of values determined to provide desirable driving characteristics. Making the individual adjustments consumes considerable time and effort as well as requiring specialized tooling to allow the adjustments to be made as quickly and accurately. Therefore, it would be desirable to reduce the number of adjustments an operator must make during the final alignment of the vehicle road wheels.

SUMMARY OF THE INVENTION

There is disclosed herein a method for aligning the suspension of a vehicle requiring fewer steps than previously performed to ensure proper and desirable driving characteristics.

The method of aligning a suspension of a vehicle having a chassis rotatably supporting a steerable set of road wheels comprises the steps of: (a) measuring actual toe, camber and caster angles for each of the road wheels and generating actual toe, camber and caster signals corresponding thereto; (b) estimating final camber angles for each of the road wheels using the actual toe signals and generating estimated camber signals corresponding thereto; (c) estimating final caster angles for each of the road wheels using the actual toe signals and generating estimated camber signals corresponding thereto; (d) generating a single side caster adjustment signal compensated to cancel camber induced drift using the estimated caster signals and the estimated camber signals; and (e) adjusting only one of the road wheels according to the single side caster adjustment signal.

It is an advantage of the present invention to provide an efficient method for aligning a suspension by reducing the number of adjustments necessary to provide desirable driving characteristics for the vehicle.

DETAILED DESCRIPTION OF THE PREFERRED EMBODIMENTS

Figure 1:
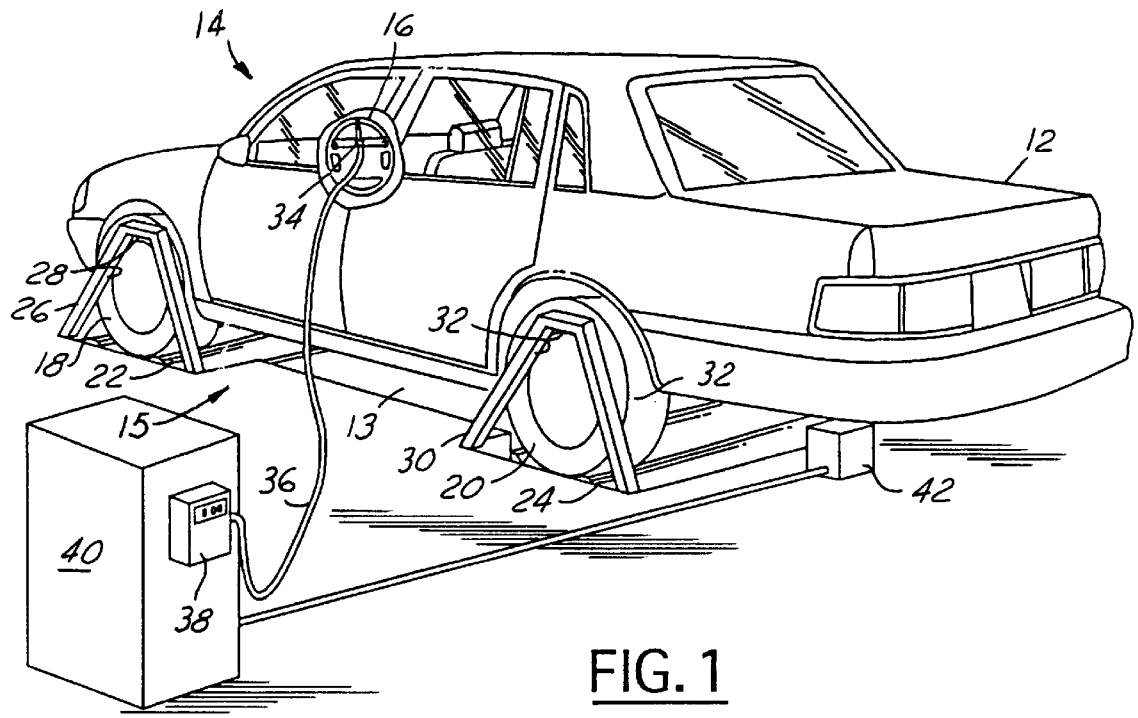
FIG. 1 is a perspective view of a vehicle positioned in a wheel alignment station in accordance with the present invention.

Referring now to the drawings, FIG. 1 shows a vehicle 12 positioned in a wheel alignment station 14 including a wheel alignment machine 15. The vehicle 12 is located above a garage pit 13 wherein an operator can make adjustments to the vehicle easily. The vehicle 12 includes a steering wheel 16, a front set of road wheels 18 and a rear set of road wheels 20. The vehicle 12 further includes a steering shaft, steering gear and a pair of tie rods, all cooperating in a known manner to connect the steering wheel 16 to the front vehicle roadwheels. For ease of description, only the left side of the vehicle is shown, it being understood that the right side of the vehicle 12 and the apparatus of the present invention are similarly structured.

The wheel alignment machine 15 shown is a "runout compensation static wheel alignment tester" manufactured by the Anzen Motor Car Company, Ltd. and described in detail in U.S. Pat. Nos. 3,453,740; 4,962,664; and 4,901,560, the disclosures of which are herein incorporated by reference. However, other types of known wheel alignment machines may be utilized as well, it being understood that the present invention is not meant to be limited solely to the wheel alignment machine described herein. The wheel alignment machine 15 is a tool for measuring geometric properties of the suspension, including the toe angle and camber angles of the vehicle road wheels 18, 20, and the caster angle formed by the upper and lower ball joints or otherwise pivotable attachments of the wheel support member (not shown) to the suspension forming a steering axis associated with the steerable wheel 18.

The wheel alignment machine 15 includes a front set of rollers 22 and a rear set of rollers 24. Interposed between each roller of each set 22, 24 is a transducer which measures the angular deviation of the wheels from a longitudinal center line on the vehicle, more commonly known as toe angle of the road wheels.

The wheel alignment machine 15 further includes a front wheel runout measurement tool 26 and a rear wheel runout measurement tool 30. These can be used to determine the camber angle of the respective wheel. Each of the runout measurement tools 26, 30, includes a plurality of triangulated rollers 28, 32, respectively, which include transducers which bear against the sidewalls of the vehicle road wheels.

Although FIG. 1 shows only the outer runout tools, the wheel alignment machine 15 includes inner runout measurement tools placed against the inner sidewalls of the vehicle road wheels. The inner and outer runout measurement tools comprise means for measuring the wheel runout of the vehicle.

The wheel alignment machine 15 further includes a front wheel caster measurement tool (not shown) which includes transducers which bear against predetermined datum points on the suspension, such as the upper and lower ball joints to determine the caster angle of the road wheel. Again, although FIG. 1 shows only the left side tools, the wheel alignment machine 15 includes tools that allow measurement of both the left and right road wheel alignment angles.

Each of the transducers of the wheel alignment machine 15, including the transducers which measure the toe, camber and caster angles of the vehicle road w generate signals sent to a processor 40 where the information is stored as will be described herein below. It should be readily apparent to one of ordinary skill in the art that the present invention may be utilized with other types of wheel alignment units, even those incapable of measuring wheel runout. The apparatus of the present invention may be utilized without a wheel runout measurement by approximating runout according to known practices.

The apparatus of the present invention further includes a steering wheel angle measuring tool 34 connected to the steering wheel 16 of the vehicle. The steering wheel angle measuring tool 34 communicates with display unit 38 operatively associated with processor 40 through cable 36. The wheel alignment machine 15 also includes a second display unit 42 (shown in phantom) located in the pit below the vehicle which the operator in the pit can see. The display unit 42 is also connected to the processor 40. As will be described in greater detail below, the steering wheel angle measuring tool 34 generates a continuous signal to the processor corresponding to the instantaneous position of the steering wheel with respect to a vertical axis of the steering wheel. As such, the tool 34 comprises means for measuring a deviation in the position of the steering wheel from a central neutral position corresponding to a predetermined toe angle of the roadwheels and for generating a signal corresponding to the deviation. As can be seen in FIG. 1, the tool 34 is fixed to the steering wheel which rotates freely with respect to the chassis of the vehicle during the alignment process.

Figure 2:
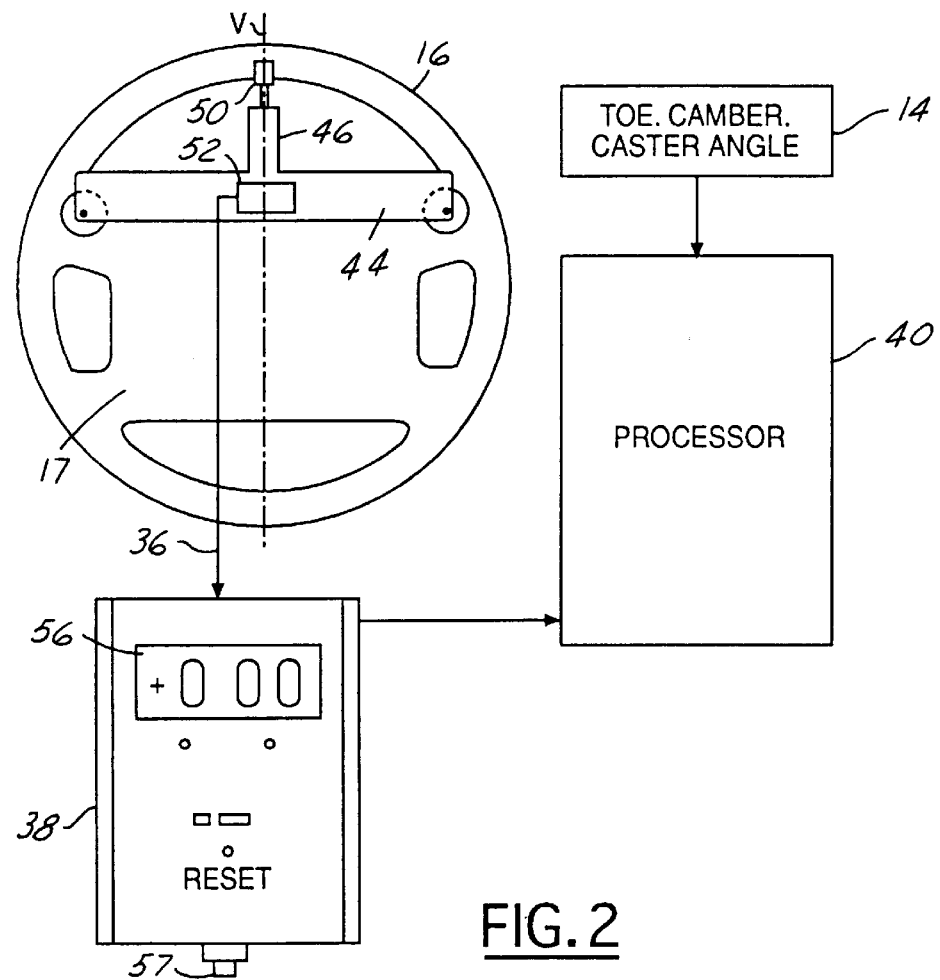
FIG. 2 is a schematic view of the components for aligning a vehicle suspension in accordance with the present invention.

As shown in FIG. 2, the steering wheel angle measuring tool 34 comprises a T-shaped member having a longitudinal arm 44 and a transverse arm 46. As illustrated, the longitudinal arm 44 of the tool extends across the inner diameter of the steering wheel 16 and rests upon a spoke 17 of the steering wheel. The transverse member 46 of the tool 34 includes a plunger 50 biased by a spring member 54 against the steering wheel 16 to secure the tool into the steering wheel 16. An inclinometer 52 is disposed on the steering wheel angle measuring tool 34 for measuring the angle the steering wheel deviates from a vertical axis of the steering wheel, V. The inclinometer may comprise any of a number of known electronic leveling tools such as level transducers or digital inclinometers. The signal is also sent to processor 40.

A display unit 38 serves two purposes in the apparatus of the present invention. The display unit 38 first receives the signal from the steering wheel angle measuring tool 34 and converts that signal to be readable by the processor 40. As will be explained below, the display unit also displays the relative measurement of the steering wheel position to the toe angle position. For example, a reading of +0.00 as illustrated in FIG. 2 corresponds to the situation wherein the steering wheel position directly corresponds to the toe angle position of the vehicle road wheels so that when the vehicle road wheels are in a straight ahead position the steering wheel is in the central neutral, or clear vision position. The display unit shows actual measurement of the steering wheel position with respect to its vertical axis. As will be explained below, an operator of the alignment machine 15 simply adjusts the toe angle of the vehicle road wheels so that a zero reading is shown on the display unit 38 to correlate the steering wheel instantaneous position to the instantaneous position of the toe angle of the vehicle roadwheels.

As described above, the wheel alignment machine 15 measures the toe caster and camber angles of the road wheels and communicates signals corresponding to the measured actuated toe, caster and camber angles to the processor 40. The processor 40 uses these signals to determine a single side caster adjustment that compensates for pull induced by side to side camber differentials. Once the caster is adjusted, the processor receives the signals from the steering wheel angle measuring tool 34 and the measured toe angle from the wheel alignment machine 15 and uses these signals to dynamically determine a desired toe angle corresponding to the instantaneous position of the steering wheel and based, in part, upon vehicle manufacturer specifications and the measured steering wheel deviation as will be explained below. The processor 40 then generates a toe adjustment signal to the display unit 38 to indicate the relative correspondence between the instantaneous toe angle measurement and the steering wheel angle measurement. When these measurements correspond, the display unit will read "0.00" as shown in FIG. 2 and the steering wheel will be within a preselected tolerance of the clear vision position when the roadwheels are in a straight ahead position.

Figure 3:
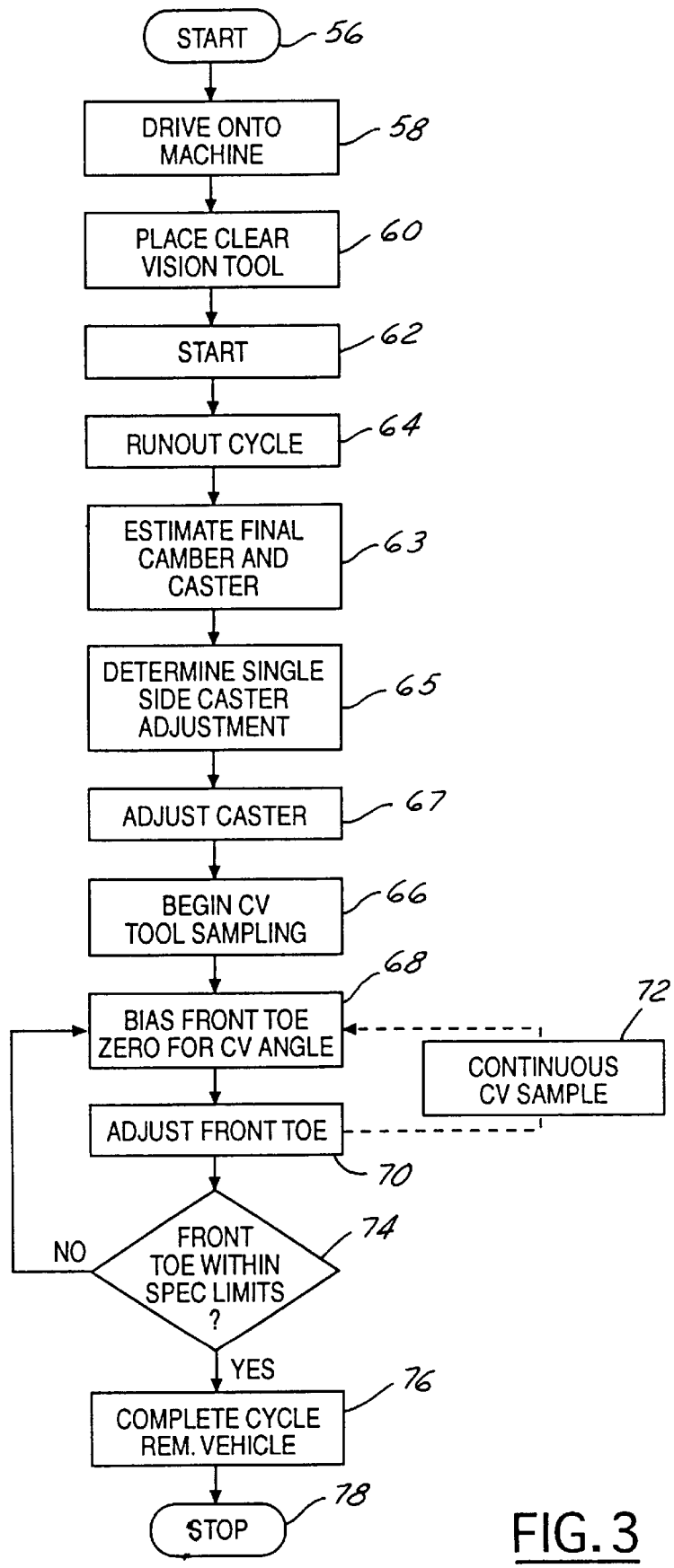
FIG. 3 is a logic flow block diagram of a method of the present invention.

Referring now to FIG. 3, a representation of the method of the present invention will now be described. Starting with block 58 of FIG. 3, the vehicle to be aligned is driven onto the wheel alignment machine 15 so that the front roadwheels 18 and rear roadwheels 20, respectively, are placed in the front rollers 22 and rear rollers 24. At block 60, the steering wheel angle measuring tool 34 is placed on the vehicle steering wheel 16. The steering wheel 16 rotates freely with respect to the vehicle chassis throughout the method of the present invention. After the tool 34 is placed on the steering wheel the process begins at start block 62.

At block 64, a wheel runout cycle begins wherein the wheel runout measuring tools 26, 30, contact the inner and outer sidewalls of the front and rear vehicle roadwheels. The rollers 22 and 24 rotate the front and rear wheels approximately two turns and the various transducers communicate signals to the processor 40 which calculates measured actual toe, caster and camber angle values to be used in determining a single side caster adjustment value and a desired toe angle set value.

At block 63, the processor calculates estimates of the final caster and camber angles in view of the anticipated toe change. This is necessary because the caster and camber angles will change as the toe angles are adjusted. The estimated final camber angles will be used to determine a differential camber, defined as the difference between the right and left side camber angle values. Using this value, the caster can be set to compensate for any pull that would be induced by the existence of a camber angle differential. Previously, the camber would directly be adjusted to eliminate the camber induced pull. Like the camber, the processor estimates the final caster angles to account for caster angle changes that will occur when the toe angles are set. The toe is set last to control clear vision and due to the overall vehicle sensitivity to variations in toe angle.

The processor 40 estimates the final camber according to the following relationship:

$$LCamber_{Est} = LCamber_{Actual} - (LToe_{Actual} - LToe_{Spec} - TA) * FX_Z$$

$$Rcamber_{Est} = Rcamber_{Actual} - (RToe_{Actual} - RToe_{Spec} + TA) * FX_Z$$

wherein:
- $LCamber_{Est}$ and $RCamber_{Est}$=left and right side estimated final camber angles after toe adjustments completed;
- $LCamber_{actual}$ and $RCamber_{Actual}$=measured left and right side actual camber angles;
- $LToe_{Actual}$ and $RToe_{Actual}$=measured left and right side actual toe angles
- $LToe_{Spec}$ and $RToe_{Spec}$=predetermined left and right toe angles based upon design specifications;
- TA=rear thrust angle (left rear toe minus right rear toe angle divided by 2)
- $FX_Z$=predetermined constant for vehicle design, reflects amount camber angle will change for one degree of toe change.

Similarly, the processor 40 estimates the final caster according to the following relationship:

$$LCaster_{Est} = LCaster_{Actual} - (LToe_{Actual} - LToe_{Spec} - TA) * FY_Z$$

$$RCaster_{Est} = RCaster_{Actual} - (RToe_{Actual} - RToe_{Spec} + TA) * FY_Z$$

wherein:
- $LCaster_{Est}$ and $RCaster_{Actual}$=left and right side estimated final caster angles after toe adjustments completed;
- $LCaster_{Actual}$ and $RCaster_{Actual}$=measured left and right side actual caster angles;
- $FY_Z$=predetermined constant for vehicle design, reflects amount the caster angle will change for one degree of toe change.

The processor 40 then proceeds to block 65 where it determines a caster adjustment necessary to compensate for pull or drift that may be induced by differential camber angles. Advantageously, this adjustment can be accomplished by adjusting a single side of the vehicle, rather than having to adjust both sides. The adjustment can take place on either side, therefore, for the presently described embodiment, the right side caster will be adjusted, it being described as the single side adjustment, it being understood that it could be either the left or right side. Therefore, the processor proceeds to generate a single side caster adjustment signal according to the following relationship:

$$SSCaster_{Target} = SSCaster_{Final} - \Delta Caster_{Spec} - P * (\Delta Camber_{Final})$$

wherein:
- $SSCaster_{Target}$=single side (right side) caster adjustment target;
- $SSCaster_{Final}$=estimated final caster angle for a single side (right side);
- $\Delta Caster_{Spec}$=predetermined design specification for differential caster;
- P=pull factor relating an amount of caster differential required to overcome or cancel pull induced by a degree of camber differential;
- $\Delta Camber_{Final}$=differential camber based on estimated final camber angles, ($LCamber_{Est}$ minus $RCamber_{Est}$)

The processor 40 uses the single side caster adjustment target to determine how much the right side caster must be adjusted by evaluating the following relationship:

$$SSCaster_{Adjustment} = SSCaster_{Target} - SSCaster_{Final}$$

which accounts for changes to the caster angles that will occur when the toe angles are adjusted. In certain circumstances, especially with sophisticated alignment equipement, it may be beneficial to display the amount of caster adjustment remaining to be made, so that at block 67 an operator can simply adjust the caster until the display reads zero. In which case, the above relationship is modified so that the operator sees a signal determined by the following relationship:

$$SSCaster_{Adjustment} = SSCaster_{Target} - SSCaster_{Final}$$

This can significantly reduce the frequency of errors associated with making the single side caster adjustments.

The processor then proceeds to block 66, where the steering wheel angle measuring tool 34 generates signals corresponding to the instantaneous position of the steering wheel with respect to its vertical axis. At block 68, the desired toe angle values are determined for the measured, instantaneous steering wheel angle position as measured at block 66. The desired toe angle values are determined by the processor 40 according to the following:

$$LToe_{Target} = LToe_{Actual} - (CV_{Actual} - CV_{Spec})SR - TA$$

$$RToe_{Target} = RToe_{Actual} + (CV_{Actual} - CV_{Spec})SR + TA$$

wherein:
- $LToe_{Target}$ and $RToe_{Target}$=desired left and right wheel toe angles;
- $LToe_{Actual}$ and $RToe_{Actual}$=measured left and right side actual toe angles;
- $CV_{Actual}$=measured steering angle deviation;
- $CV_{Spec}$=predetermined steering wheel angle position with respect to its vertical axis based upon design specifications;
- SR=ratio of the angular distance the steering wheel rotates to the angular movement of said road wheels. A typical steering ratio for a truck is approximately 19.5:1 and for a car is approximately 15:1.

At block 70, the toe angle of the vehicle is adjusted by an operator by known mechanical means such as by moving the tie rod adjusters in order to achieve a 0.00 reading on the display unit 38. While the toe adjusters are being manipulated, it often occurs that the steering wheel moves relative to its initial position. Because of the movement of the steering wheel, block 72 indicates that a continuous steering wheel angle position measurement, CV, is taken. This measurement gives the continuous, instantaneous position of the steering wheel deviation from the steering wheel's vertical axis. This actual CV reading is incorporated into the above formula to again determine a desired toe value. This continuous computation done on a real time basis dynamically determines the desired toe angle corresponding to the instantaneous position of the steering wheel.

At decision block 74, the processor determines whether the front and rear toe is within the specified limits as determined by the vehicle manufacturer. If not, the method returns to block 68 to begin the calculation of the desired toe angle corresponding to the instantaneous position of the steering wheel again. If at block 74 the front toe is within the specified limits, at block 76 the operator tightens the toe adjusters and the vehicle is removed from the wheel alignment unit 14.

It should be recognized by those skilled in the art that the previously described continuous measurement and updating steps for adjusting the front toe, blocks 68–74, could similarly be applied to the previously described process for adjusting the caster.

Specifically, blocks 63–67 could be incorporated in a loop structure like 68–74, wherein as the caster is actually adjusted, the actual toe caster and camber angle signals are updated providing additional confidence in the final caster setting over the process that uses only the original values for setting the single side caster adjustment target.

Based upon the above method, it should be readily apparent that the apparatus of the present invention may be utilized in a new car assembly plant to align the toe angle of the front and rear roadwheels of the vehicle to the instantaneous position of the steering wheel by utilizing generally the same steps as in the method described above. Furthermore, the apparatus may be utilized at service stations and other types of after-market facilities. The present invention is not meant to be limited solely to a new vehicle manufacturing environment and may be utilized in the after market as well.

It should be readily apparent to those skilled in the art that many other configurations and permutations of the present invention are readily available. It is the following claims, including all equivalents which define the scope of the present invention.

What is claimed is:

1. A method of aligning a suspension of a vehicle having a chassis rotatably supporting a steerable set of road wheels, said method comprising the steps of:

measuring actual toe, camber and caster angles for each of the road wheels and generating actual toe, camber and caster signals corresponding thereto;

estimating final camber angles for each of the road wheels using said actual toe signals and generating estimated camber signals corresponding thereto;

estimating final caster angles for each of the road wheels using said actual toe signals and generating estimated camber signals corresponding thereto;

generating a single side caster adjustment signal compensated to cancel camber induced drift using said estimated caster signals and said estimated camber signals; and adjusting only one of the road wheels according to said single side caster adjustment signal.

2. A method according to claim 1, wherein said steps of estimating final caster and final camber further include using a rear thrust angle signal calculated using toe angles measured from a rear pair of vehicle road wheels.

3. A method according to claim 1, wherein said step of generating a single side caster adjustment signal includes using a pull factor reflecting vehicle pull sensitivity to side to side camber and caster differentials.

4. A method according to claim 1, wherein said step of generating a single side caster adjustment signal includes evaluating the following formula:

$$SSCaster_{Target} = SSCaster_{Final} - \Delta Caster_{Spec} - P^*(\Delta Camber_{Final})$$

wherein:

$SSCaster_{Target}$=single side caster adjustment target;

$SSCaster_{Final}$=estimated final caster angle for a single side;

$\Delta Caster_{Spec}$=predetermined design specification for differential caster;

P=pull factor relating caster differential required to overcome pull induced by camber differential;

$\Delta Camber_{Final}$=differential camber based on estimated final camber angles.

5. A method according to claim 4, wherein said step of generating a single side caster adjustment signal further includes evaluating the following formula:

$$SSCaster_{Adjustment} = SSCaster_{Target} - SSCaster_{Final}$$

wherein:

$SSCaster_{Adjustment}$=single side caster adjustment signal indicating adjustment required;

$SSCaster_{Target}$=single side caster adjustment target;

$SSCaster_{Final}$=estimated final caster angle for a single side.

6. A method according to claim 1, further comprising the steps of:

calculating desired toe angles for both road wheels; and setting said toe angles to said desired toe angles after said step of adjusting only one of the road wheels.

7. A method of aligning a suspension of a vehicle having a chassis rotatably supporting a steerable set of road wheels, said method comprising the steps of:

measuring actual toe, camber and caster angles for each of the road wheels and generating actual toe, camber and caster signals corresponding thereto;

estimating final camber angles for each of the road wheels using said actual toe signals and generating estimated camber signals corresponding thereto;

estimating final caster angles for each of the road wheels using said actual toe signals and generating estimated camber signals corresponding thereto;

generating a single side caster adjustment signal compensated to cancel camber induced drift using said estimated caster signals and said estimated camber signals;

adjusting only one of the road wheels according to said single side caster adjustment signal.

calculating desired toe angles for both road wheels; and adjusting said toe angles to said desired toe angles after said step of adjusting only one of the road wheels.

8. A method according to claim 7, wherein said steps of estimating final caster and final camber further include using a rear thrust angle signal calculated using toe angles measured from a rear pair of vehicle road wheels.

9. A method according to claim 7, wherein said step of generating a single side caster adjustment signal includes using a pull factor reflecting vehicle pull sensitivity to side to side camber and caster differentials.

10. A method according to claim 7, wherein said step of generating a single side caster adjustment signal includes evaluating the following formula:

$$SSCaster_{Target} = SSCaster_{Final} - \Delta Caster_{Spec} - P^*(\Delta Camber_{Final})$$

wherein:

$SSCaster_{Target}$=single side caster adjustment target;

$SSCaster_{Final}$=estimated final caster angle for a single side;

$\Delta Caster_{Spec}$=design specification for differential caster;

P=pull factor relating caster differential required to overcome pull induced by camber differential;

$\Delta Camber_{Final}$=differential camber based on estimated final camber angles.

11. A method according to claim 10, wherein said step of generating a single side caster adjustment signal further includes evaluating the following formula:

wherein:

$SSCaster_{Adjustment}$=single side caster adjustment signal indicating adjustment required;

$SSCaster_{Target}$=single side caster adjustment target;

$SSCaster_{Final}$=estimated final caster angle for a single side.

12. A method of aligning a suspension of a vehicle having a chassis rotatably supporting a steerable set of road wheels, said method comprising the steps of:

measuring actual toe, camber and caster angles for each of the road wheels and generating actual toe, camber and caster signals corresponding thereto;

estimating final camber angles for each of the road wheels using said actual toe signals and generating estimated camber signals corresponding thereto;

estimating final caster angles for each of the road wheels using said actual toe signals and generating estimated camber signals corresponding thereto;

generating a single side caster adjustment signal compensated to cancel camber induced drift using said estimated caster signals and said estimated camber signals and a pull factor reflecting vehicle pull sensitivity to side to side camber and caster differentials; and adjusting only one of the road wheels according to said single side caster adjustment signal.

13. A method according to claim 12, wherein said steps of estimating final caster and final camber further include using a rear thrust angle signal calculated using toe angles measured from a rear pair of vehicle road wheels.

14. A method according to claim 12, wherein said step of generating a single side caster adjustment signal includes evaluating the following formula:

$$SSCaster_{Target}=SSCaster_{Final}-\Delta Caster_{Spec}-P*(\Delta Camber_{Final})$$

wherein:

$SSCaster_{Target}$=single side caster adjustment target;

$SSCaster_{Final}$=estimated final caster angle for a single side;

$\Delta Caster_{Spec}$=design specification for differential caster;

P=pull factor relating caster differential required to overcome pull induced by camber differential;

$\Delta Camber_{Final}$=differential camber based on estimated final camber angles.

15. A method according to claim 14, wherein said step of generating a single side caster adjustment signal further includes evaluating the following formula:

$$SSCaster_{Adjustment}=SSCaster_{Target}-SSCaster_{Final}$$

wherein:

$SSCaster_{Adjustment}$=single side caster adjustment signal indicating adjustment required;

$SSCaster_{Target}$=single side caster adjustment target;

$SSCaster_{Final}$=estimated final caster angle for a single side.

16. A method according to claim 12, further comprising the steps of:

calculating desired toe angles for both road wheels; and setting said toe angles to said desired toe angles after said step of adjusting only one of the road wheels.

* * * * *